(12) United States Patent
Martin

(10) Patent No.: US 7,971,823 B2
(45) Date of Patent: Jul. 5, 2011

(54) SAUCER SHAPED GYROSCOPICALLY STABILIZED VERTICAL TAKE-OFF AND LANDING AIRCRAFT

(76) Inventor: Herbert Martin, Paducah, KY (US)

(*) Notice: Subject to any disclaimer, the term of this patent is extended or adjusted under 35 U.S.C. 154(b) by 309 days.

(21) Appl. No.: 12/387,770

(22) Filed: May 7, 2009

(65) Prior Publication Data

US 2010/0282918 A1   Nov. 11, 2010

(51) Int. Cl.
  *B64C 29/00* (2006.01)
(52) U.S. Cl. ............. 244/23 C; 244/8; 244/12.2; 244/39
(58) Field of Classification Search ............. 244/8, 12.2, 244/23 C, 23 B, 23 A, 4 A, 17.11, 39
See application file for complete search history.

(56) References Cited

U.S. PATENT DOCUMENTS

| 4,807,830 | A | * | 2/1989 | Horton | 244/12.2 |
| 5,259,571 | A | * | 11/1993 | Blazquez | 244/12.2 |
| 6,050,520 | A | * | 4/2000 | Kirla | 244/23 A |
| 6,837,457 | B2 | * | 1/2005 | Kirjavainen | 244/17.23 |
| 7,407,132 | B2 | * | 8/2008 | Kirjavainen | 244/23 R |
| 2010/0051754 | A1 | * | 3/2010 | Davidson | 244/23 C |
| 2010/0270420 | A1 | * | 10/2010 | Hansen | 244/12.2 |

* cited by examiner

*Primary Examiner* — J. W Eldred
(74) *Attorney, Agent, or Firm* — Stockwell & Smedley, PSC

(57) ABSTRACT

An aircraft that is housed within a gyroscope providing for improved flight stability that includes an inner hull which remains stationary within a rotating outer hull. A rotating sine-wave ring is used to activate and move a plurality of pistons which will intake air from above the upper surface of the inner hull configuration and create a negative pressure on the aircraft. The craft contains compression chambers which receive the air and which feed the various impeller thrusters which are rotational within three-fourths of a hemisphere.

20 Claims, 17 Drawing Sheets

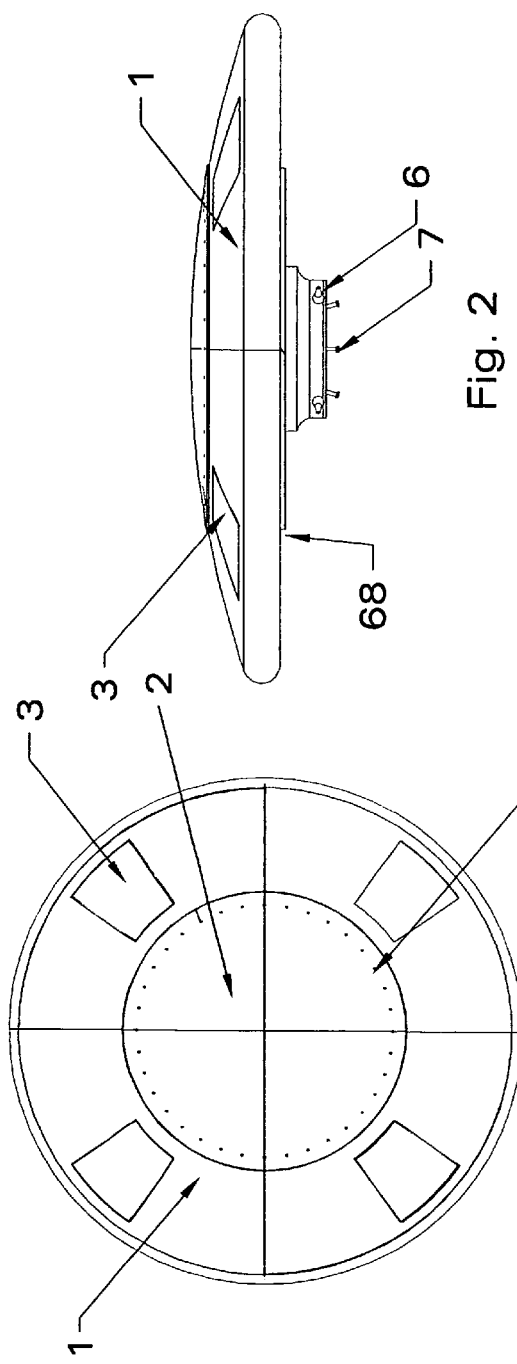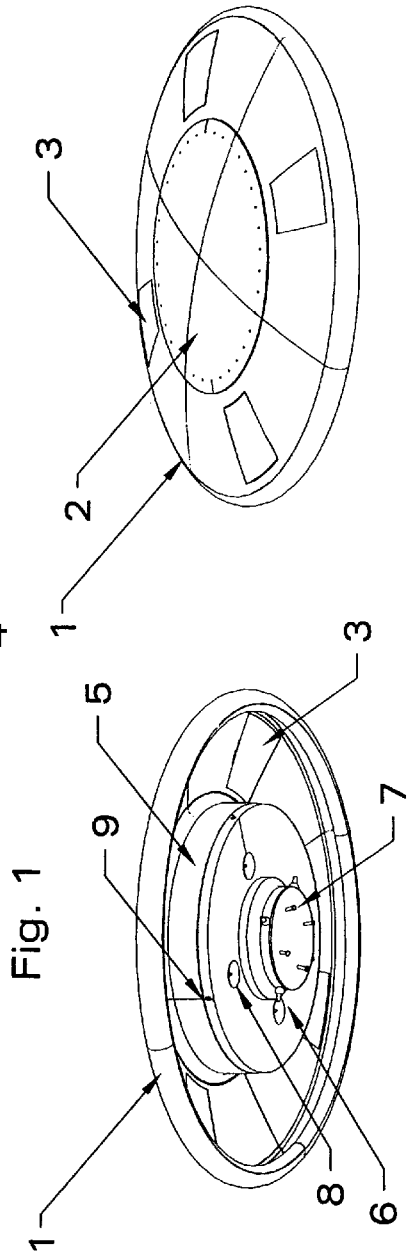

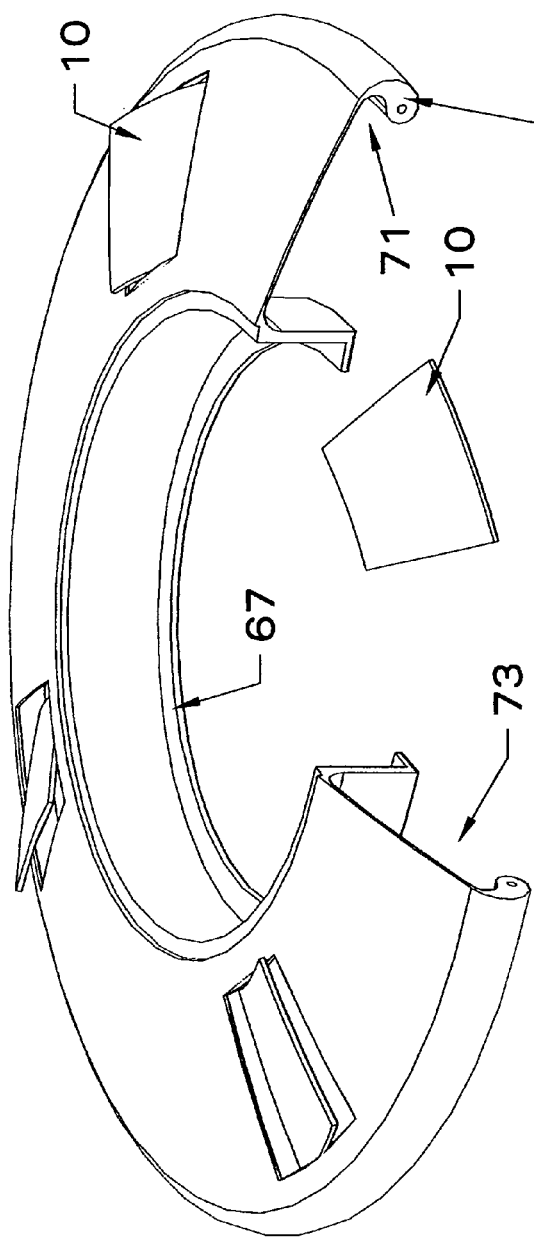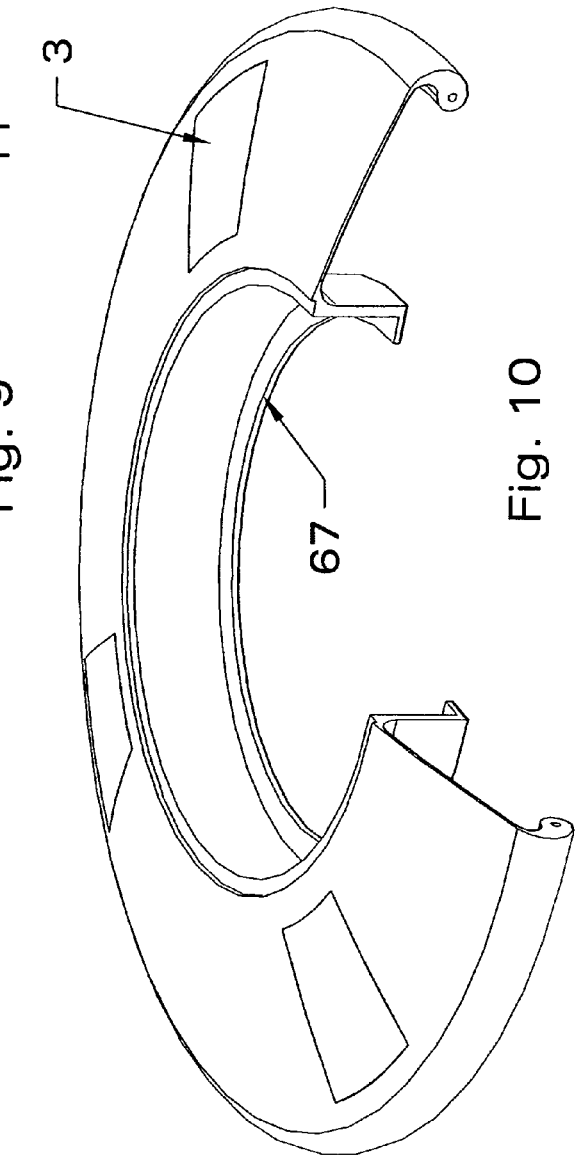

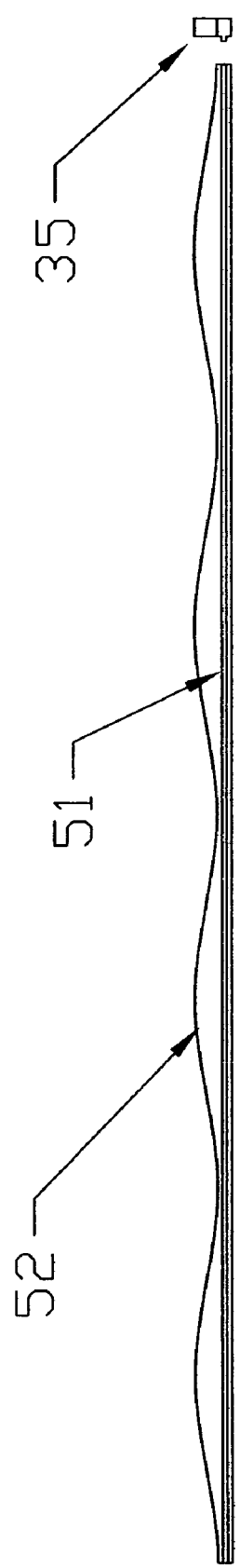
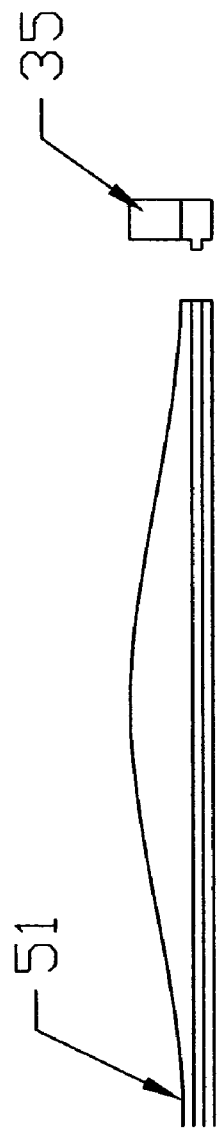

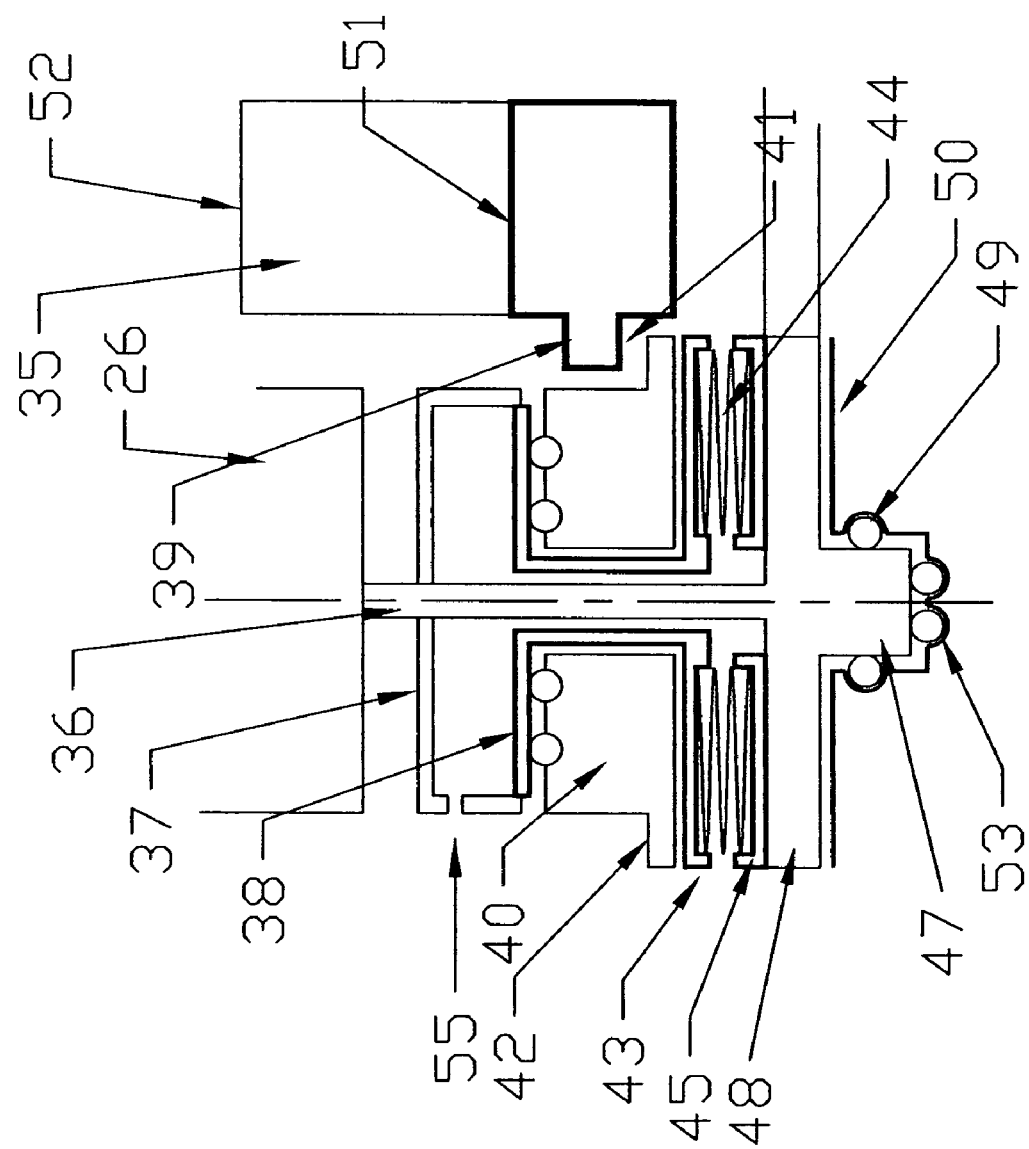

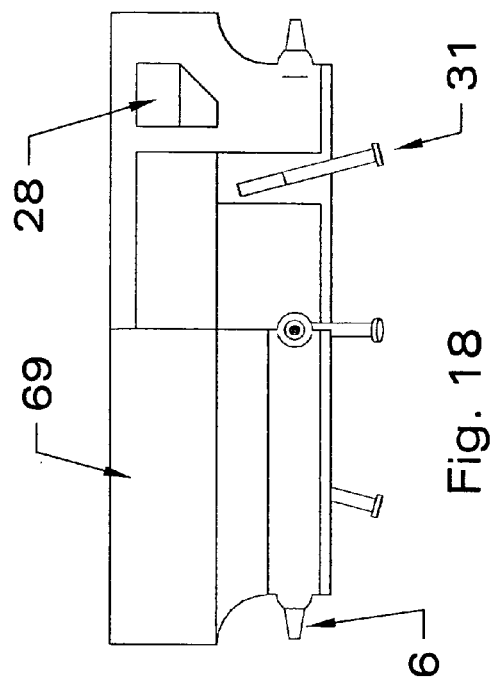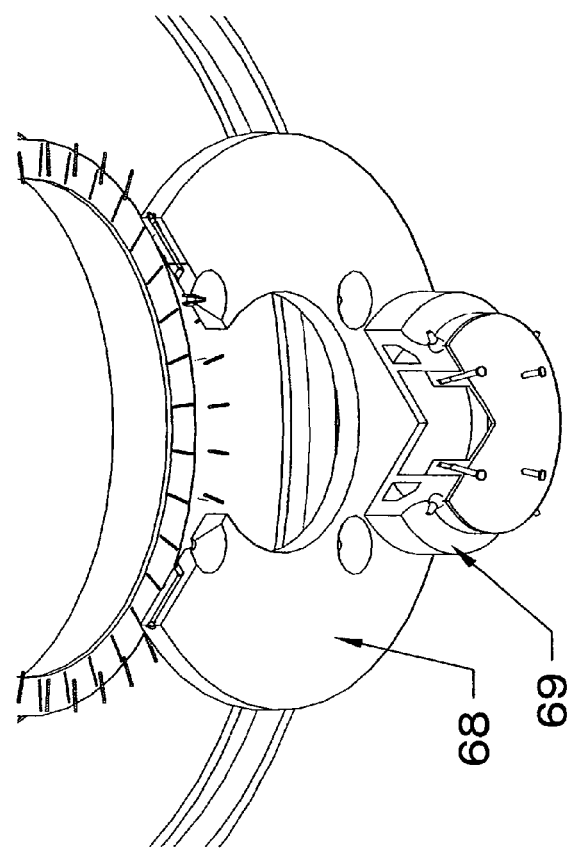

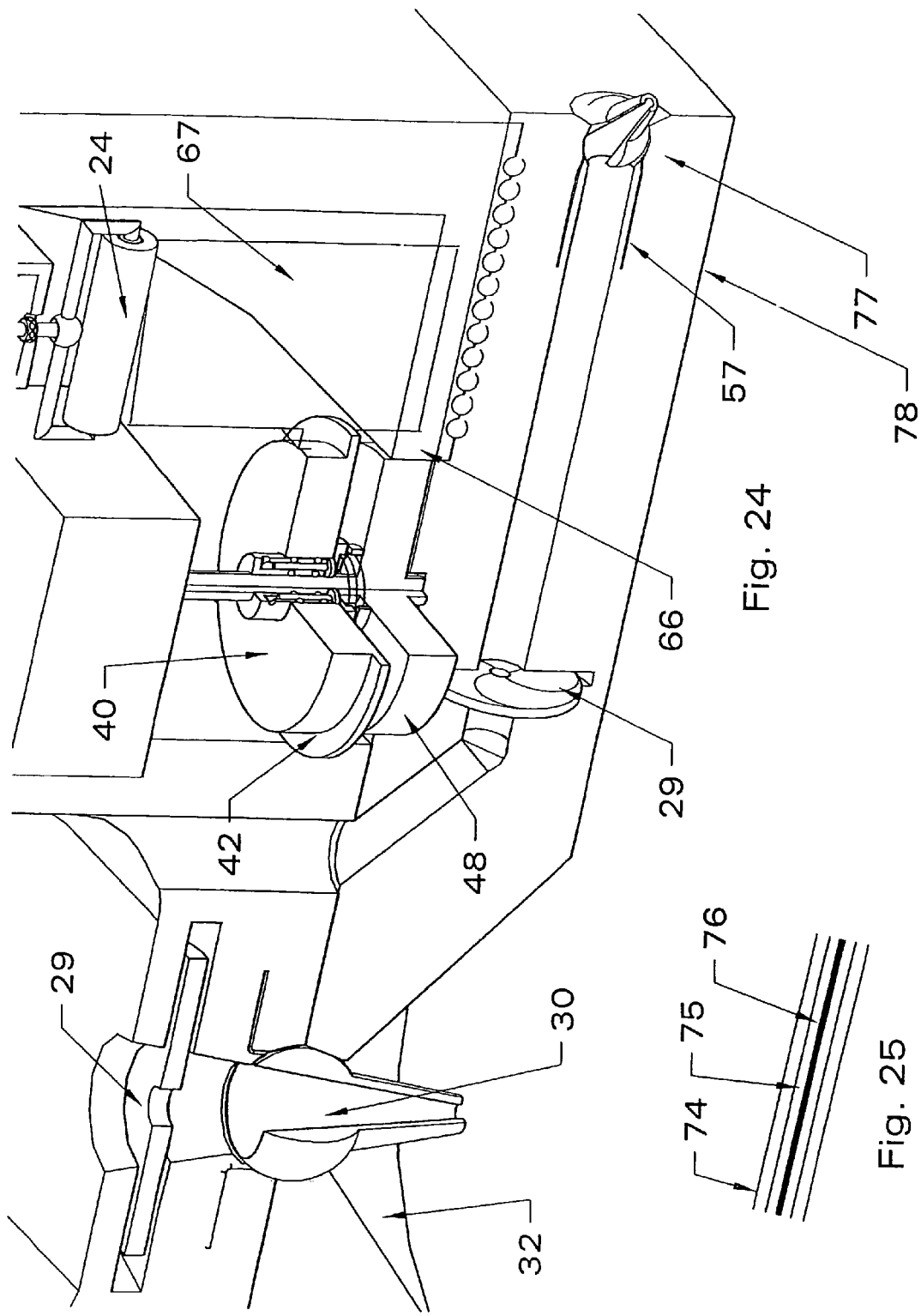

SAUCER SHAPED GYROSCOPICALLY STABILIZED VERTICAL TAKE-OFF AND LANDING AIRCRAFT

BACKGROUND OF THE INVENTION

1. Field of the Invention

The present invention relates to vehicles and more particularly to flying vehicles.

2. Description of Related Art

With the current concerns over the polluting of the atmosphere, climatic change, and damage to the ozone layer, a critical look at and solution to the problems is necessary. Today jet planes fly higher than stratocumulus and altostratus clouds and spew polluting material at altitudes that are too high to be easily returned to Earth by rainfall, creating a permanent concealment of dirt that traps too much heat beneath its veil. Also, the intense heat from the rockets and other vehicles of various countries' space programs punch their way into outer space and continually burn off the ozone layer in their flight, inflicting damage that will last for many generations. Furthermore, millions of gallons of petroleum products are burned up daily with the prospect of depleting the world supply within this century becoming a real possibility with little thought being given to alternative fuels and alternative methods for air travel. There is an unmet need for a method to slip through the atmosphere and into outer space rather than blasting through it. There is also a need for a method to travel around the world without leaving a trail of pollution in the wake. Furthermore, considering the threat of terrorism around the globe, a method of surveillance that is small, remote-controlled, quiet, and does not crawl on the ground would be useful as well. There is also a need for a device that can effectively maneuver through an ongoing disaster area to perform human rescue attempts; as well as a need for a device that can remain aloft for extended periods of time in order to effectively vacuum the upper atmosphere and replenish the ozone layer while improving a polluted Earth to a better condition.

The ability to lift off vertically from the ground, hover above the ground, and move in translational flight with the ground currently exists with helicopters, Harrier jet planes, and hovercraft. Included among a long list of such craft are the VZ-9-Av Avrocar, U.S. Pat. No. 3,062,482, Moller's M200x flying saucer, U.S. Pat. No. 3,410,507 which used multiple engines, and the Aerobots described in U.S. Pat. No. 4,795,111 which used a single fan and up to eight ducted fans powered by rotary engines. The Bombadier CL-327 Guardian VTOL, UAV featured dual, coaxial, contra-rotating rotors, the concept of which is now being sold in a children's toy. The electric motor of the AROD was ground supplied with generation and thereby tethered limiting the flight radius. Notably, a VTOL hover platform by Sanders, U.S. Pat. No. 7,249,732 uses battery power or fuel cell technology to power the engines of a surveillance device, but it contains no technology that is new nor different from that of a helicopter.

BRIEF SUMMARY OF THE INVENTION

Embodiments of the present invention relate to a system and device that addresses at least some of the above-identified needs with a airborne vehicle as described in detail herein. By varying the size and sophistication of the vehicle, embodiments of the present invention can be adapted to fulfill many, if not all, the above-identified needs.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of the invention are illustrated by way of example, and not by way of limitation, in the accompanying drawings, wherein:

FIG. 1 is a top view of embodiments of the present invention showing the outer rotating gyroscopic hull with the air foil propellers positioned within the plane of the hull and the inner stationary hull with the air intake openings.

FIG. 2 is a front view of embodiments of the present invention showing the outer rotating gyroscopic hull with the air foil propellers positioned within the plane of the hull, the inner stationary hull with the air intake openings, the exterior shell of the compression chamber showing the lift and propulsion thrusters, and the retractable landing legs.

FIG. 3 is a top perspective view of embodiments of the present invention showing the outer rotating gyroscopic hull with the air foil propellers positioned within the plane of the hull and the inner stationary hull with the air intake openings.

FIG. 4 is an underside perspective view of the embodiments of the present invention showing the outer rotating, disk-shaped, gyroscopic hull with the air foil propellers positioned within the plane of the hull and the inner stationary hull showing the exterior shell of the compression chamber with the lift thrusters, the rotation stabilization and direction maneuvering thrusters, the propulsion thrusters and showing the retractable landing legs.

FIG. 9 is a cut-away perspective view of the outer rotating gyroscopic hull with the air foil propellers tilted into a lift position.

FIG. 10 is a cut-away perspective view of the outer rotating gyroscopic hull with the air foil propellers positioned within the embodiment of the hull.

FIG. 11 is a stretch-out view of the sine-wave ring with a rotated section.

FIG. 12 is a stretch-out view of one cycle of the sine-wave ring with a rotated section.

FIG. 13 is a section view of the sine-wave ring showing the lower drive wheel and the upper drive wheel not in contact with the sine-wave ring.

FIG. 18 is an enlarged section of the annular compression chamber and the landing legs.

FIG. 20. is an underside pictorial showing the lift thrusters, the directional guidance and rotation stabilization thrusters, the propulsion thrusters, and the roller bearing ring.

FIG. 24 is an enlarged pictorial of the upper and lower drive wheels and the directional thruster rotated into a counter-clockwise turning position.

FIG. 25 is a cross section of the multiple laminated hull skin.

DETAILED DESCRIPTION OF INVENTION

Figure 5:
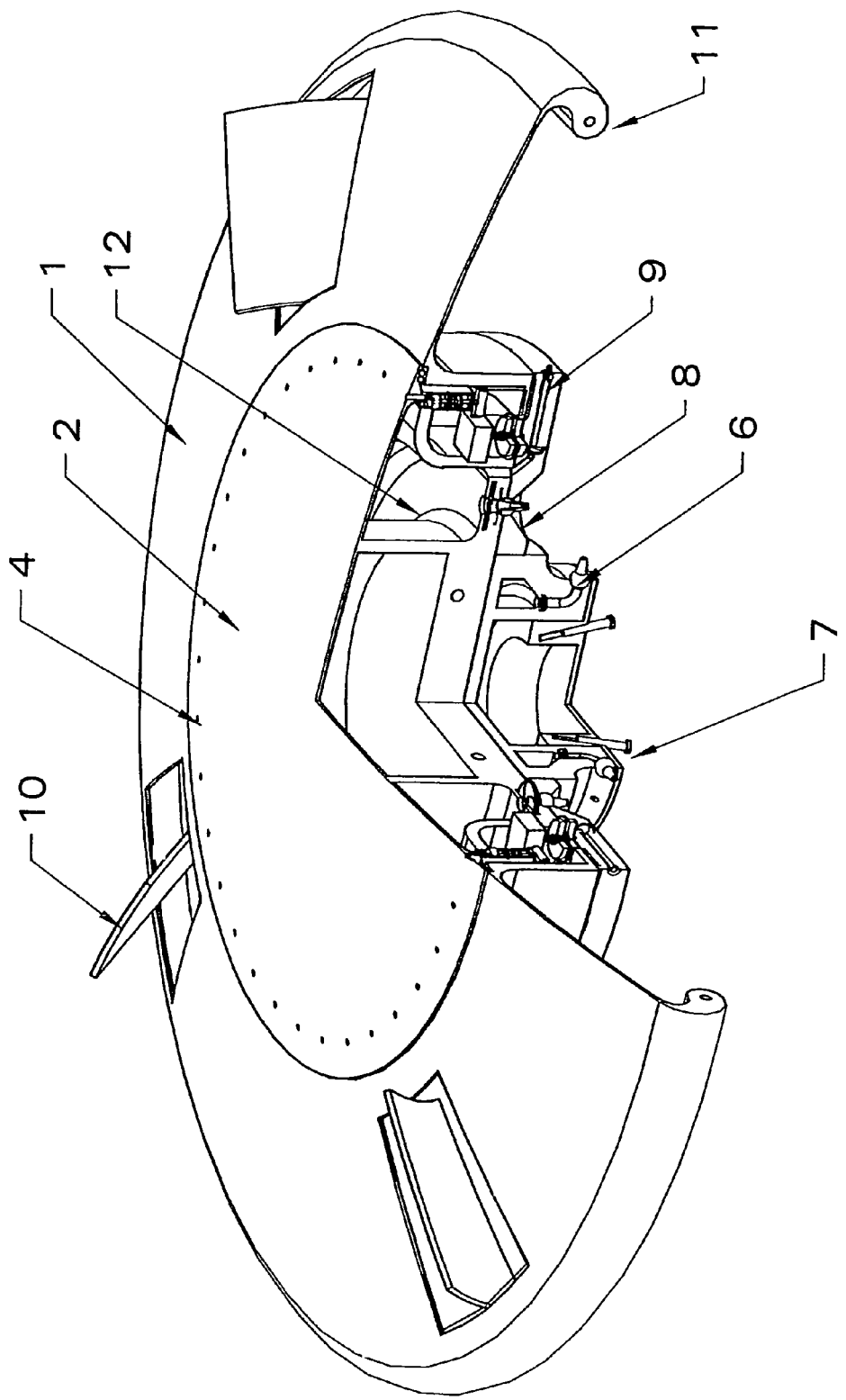
FIG. 5 is a cut-away perspective view of the entire assembly with the air foil propellers tilted into a lift position.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Embodiments of the present invention relate to an aircraft that is housed entirely within a gyroscope providing the improved flight stability. It introduces the new concept of a sine-wave ring that is used to activate a plurality of pistons which will intake air from above the upper surface of the inner hull configuration and create a negative pressure on the aircraft. The craft contains compression chambers which feed the various impeller thrusters which are rotational within three-fourths of a hemisphere. The rotational stabilization thrusters which exhaust in a direction contrary to the rotation of the gyroscopic hull will be employed constantly during flight and are used to counterbalance the rotational effect on the inner body so that only the outer gyroscopic hull is rotating. The directional guidance thrusters are used to rotate the aircraft in either a clockwise or counterclockwise direction based on the need for a change of direction during flight. The lift thrusters are used to relieve excess pressure in the compression chambers and to provide lift while the air foils are positioned within and flush with the rotating outer hull. The propulsion thrusters are used to propel the aircraft in any direction and can be used for forward movement or for stopping movement in order to hover while in flight. Varying, by increasing or lessening, the exhaust pressure on the individual lift thrusters around the aircraft can alter the angle of inclination of the entire craft thereby, when used in conjunction with the propulsion thrusters, can propel the aircraft into an ascension or descent mode as desired. Safety pressure relief devices are installed in the thrusters to prevent excess pressure buildup in the compression chamber as well as releasing the pressure plate connector that drives the sine-wave ring. Electric power from high-capacity batteries may be used to drive the motors that power the sine-wave ring and the gyroscopic hull, and this power may, beneficially, be replenished by a device that captures solar energy. Although it is the intent of this invention to provide a quiet, non-polluting method of flight, it is also not the intent that the claims of the invention be restricted to only these ideals. Alternatively, the motors may also be powered by more conventional means, and if more rapid flight is desired, the rear propulsion thrusters, allowing for a modification of the design, may be jet propelled or rocket propelled that would allow for terrestrial and extraterrestrial travel.

According to embodiments, a saucer-shaped aircraft employs a rotary outer disk configuration containing a perimeter toroid with an embedded annular weight to function as a gyrostabilizer for the entire craft. Also contained within the saucer-body contour, a plurality of rotational adjustable air foils function as lift-off propellers when the outer disk, the base rim of which rests on a flat cylindrical surface containing a plurality of ball bearings, is rotating around a vertical axis central to the entire shape. The air foils are rotational along an axis coincident with radial lines emanating from the central axis and within the curved plane of the outer disk hull and are primarily used for liftoff or to maintain altitude when the aircraft is excessively loaded, the amount of lift being determined by the angle of inclination.

When altitude has been achieved and the air foils are no longer needed to remain aloft, the air foils are rotated into the plane of the outer hull creating a gravity resistant air pressure, similar to the function of a parachute, which helps to stabilize the aircraft and reduce wind resistance.

The rotary outer disk is driven by pressure coupling clutches or cylindrical gears turned by a multiplicity of three or more equally spaced electric, battery driven motors that are precisely located to maintain the balance and stability of the aircraft. These motors are also used with pressure contacts to drive a sine-wave ring assembly sharing the common, vertical, central axis and resting on the upper ball-bearing surface of a lip on the rotary outer disk. The sine-wave ring, when it rotates, drives a multiplicity of piston assemblies connected to the fixed inner disk which contains a plurality of air intake holes creating a negative pressure on the upper surface when air is sucked into the holes, and this air is then exhausted into a multi-compartmentalized compression chamber with the air pressure from the compartments being used to drive at least three pluralities of multi-directional, airscrew-impeller thrusters (A. Lift thrusters, B. Directional guidance and rotation stabilization thrusters, and C. Propulsion thrusters).

The multiplicity of multidirectional lift thrusters are primarily directed downward and are used for lift especially when the air-foil propellers are in a closed position within the outer hull. The directional guidance thrusters are used to turn the air craft rotationally in circular directions around the vertical central axis, and the rotational stabilization thrusters are used to counterbalance the rotational gyroscopic effect of the rotating outer hull. The multidirectional propulsion thrusters are used to propel the aircraft primarily forward but also rearward or sideways in any desired direction. The size of the aperture openings controls the amount of compressed air released into the impellers and thereby controls the jet propulsion action needed by the thrusters to attain proper lift, turn, and speed. Retractable legs permit the aircraft to land without impeding the rotational movement of the outer saucer body. Since no carbon fuels are used, little or no pollution is introduced into the atmosphere, and removable air filters are embedded in the compressed air chambers thereby filtering and cleaning existing air through which the aircraft travels.

Below is a legend table for the elements depicted in the figures. Functional names and labels have been given to each element but are not intended to limit these elements to only these functions but rather to aid the reader in understanding embodiments of the present invention.

1. Outward Rotating Hull
2. Inward Stationary Hull
3. Air Foil Propellers, Closed
4. Air Intake Openings
5. Vertical leg of rotating outward hull
6. Propulsion Thruster
7. Retractable Leg
8. Lift Thruster
9. Directional and Stabilization Thruster
10. Air Foil Propellers, Open
11. Imbedded Annular Weight
12. Interior of Compression Chamber
13. Flexible Flap for Piston Exhaust Into Compression Chamber
14. Flexible Flap for Piston Intake of Outside Air
15. Ball Bearing Ring for Inward/Outward Hulls
16. Bearing Surface of Outward Rotating Hull
17. Piston Assembly
18. Piston Chamber
19. Ring Bearing
20. Piston Spring
21. Piston Spring Flange
22. Ball and Socket for Rocker Arm
23. Rocker Arm
24. Piston Roller
25. Piston Rod
26. Motor
27. Annular Tube Feeder for Propulsion Thrusters
28. Compression Chamber for Propulsion Thrusters
29. Aperture Opening for Propulsion Thrusters
30. Ball and Socket Rotational Air Screw Fan Impeller thruster
31. Retractable Landing Leg
32. Cone recess in annular lower plate
35. Sine-wave ring
36. Connecting rod to lower drive wheel
37. Pressure relief compression chamber housing
38. Moveable compressor
39. Projection lip on sine-wave ring
40. Upper drive wheel
41. Gap when upper drive wheel is not in contact with sine-wave ring
42. Contact flange on upper drive wheel
43. Lower surface of moveable compressor
44. Compression spring compressed
45. Lower housing for compression spring
46. Closed gap when upper drive wheel is in contact with sine-wave ring
47. Base spindle for lower drive wheel
48. Lower drive wheel
49. Side bearings for base spindle
50. Upper surface of lower plate
51. Sine-wave ring base (nadir)
52. Sine-wave ring crest (zenith, apogee)
53. Spindle base bearings
54. Compression spring not compressed
55. Pressurized air intake into pressure relief compression chamber
56. Non-pressurized air intake into pressure relief compression chamber
57. Directional controls for impeller thruster
58. Annular roller bearing ring imbedded in lower plate
59. Compressed air tube leading to propulsion thruster
60. Battery or fuel storage compartment
61. Outer surface of lower plate
62. Optional removable filtering system
63. Circular base of sine-wave ring
64. Center axis of craft
65. Upper boundary line of piston assembly movement -continued 66. Friction or gear connection between lower drive wheel and outer rotating hull
67. Support arm for outward rotating hull
68. Lower plate
69. Housing for fuel storage, retractable legs, and propulsion thrusters
70. Friction or gear edge on support arm for outer rotating hull
71. Trapped air cavity for sustaining lift
72. Compressed air tube leading from aperture to directional thruster
73. Disk-shaped (Frisbee) shaped hull
74. Clear fiberglass layer of skin laminate
75. Kevlar layer of skin laminate
76. Titanium mesh layer of skin laminate
77. Directional thruster rotated
78. Lift thruster base plate
79. Vertical leg of stationary inward hull
80. Base Plate
81. Roller bearing for upper drive wheel As mentioned earlier, embodiments of the present invention relate to a saucer-shaped aircraft as illustrated FIGS. 1,2 3, and 4. In FIG. 1, a plan view of the present invention and in FIG. 3, a top perspective view, it is illustrated that there exists an outward hull (1) and an inward hull (2) which comprise the basic overall saucer shape of the aircraft. As readily apparent the shape resembles that of a Frisbee® or other throwing disks. The outward hull is designed to be rotational and provide gyroscopic stability to the craft while the inward hull is stationary, which is beneficial if the aircraft is to be passenger bearing. The direction of rotation for the outward hull will necessarily depend upon the hemisphere in which the travel is being conducted, a clockwise direction in the Northern hemisphere and a counterclockwise direction in the Southern hemisphere. In order to provide ground clearance for the rotating outer hull, retractable legs (7) are imbedded in the base of the aircraft and will be in a hidden, retracted position during flight so as to not create drag. Positioned within the plane of the outward hull (1) are a multiplicity of air foil propellers (3) and in this closed position, they are designed to, along with the rest of the hull create a resistance to descent by compressing the outside air underneath its umbrella, mimicking a parachute.

Figure 15:
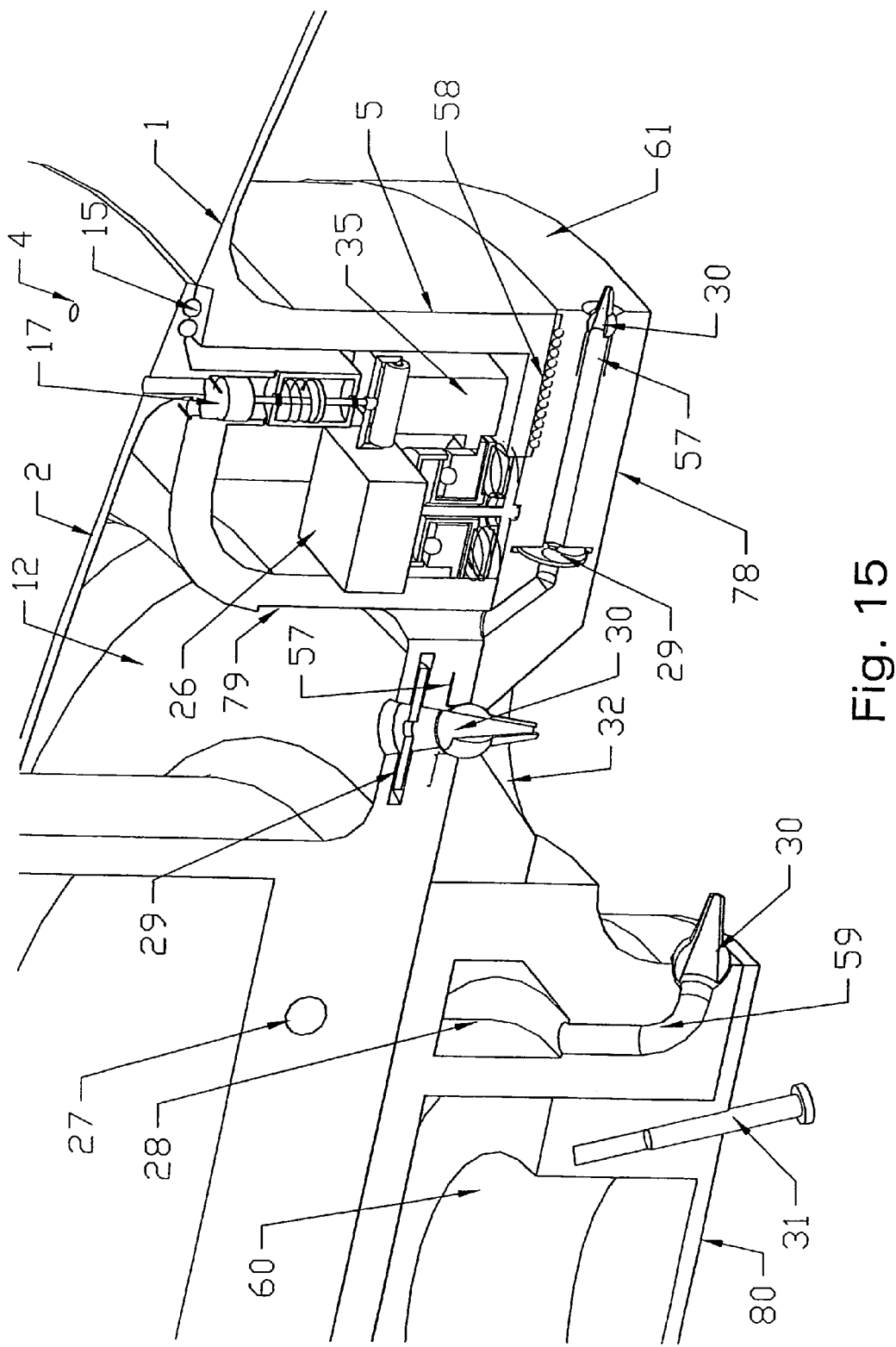
FIG. 15 is an enlarged cut-away pictorial of the compression drive assembly.
Figure 22:
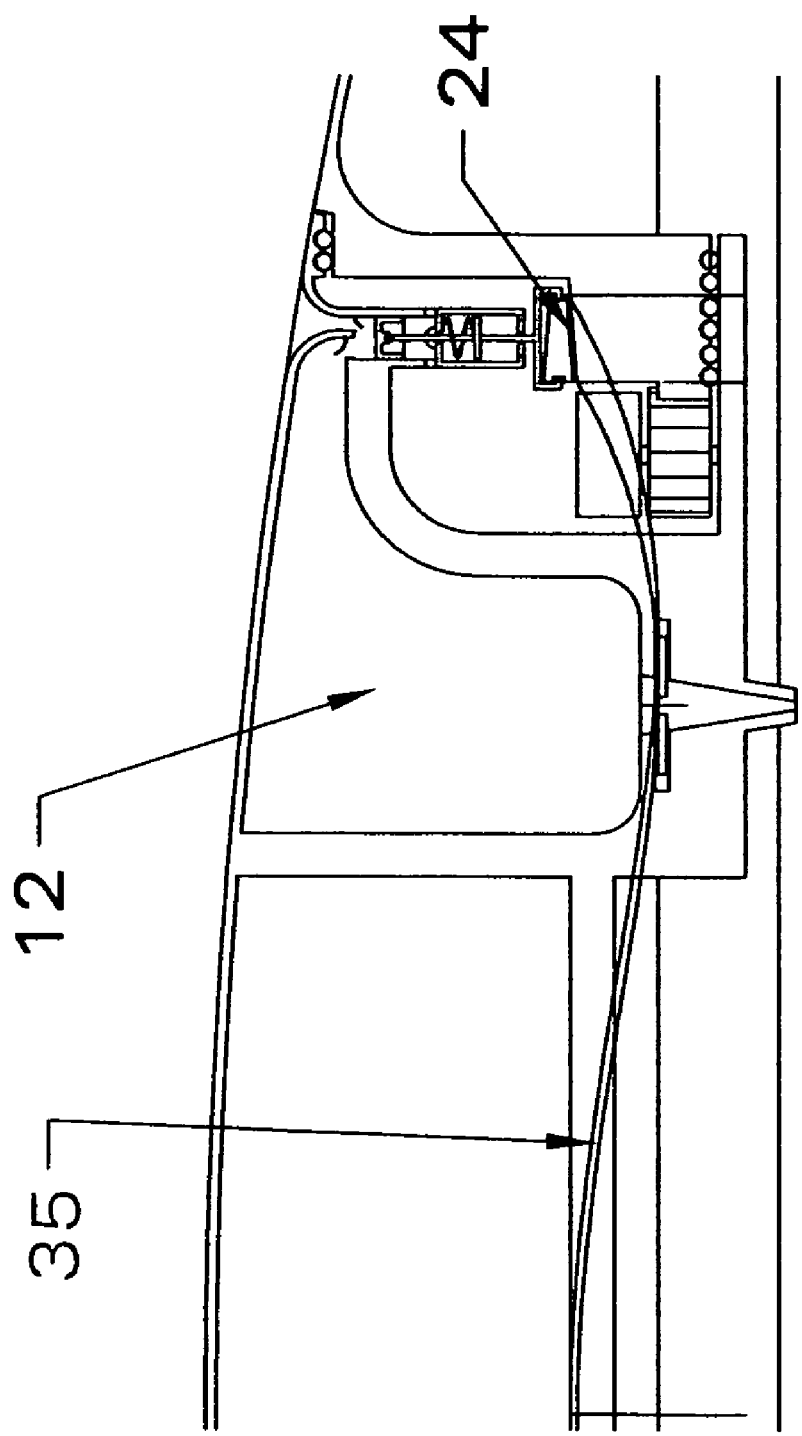
FIG. 22 is an enlarged view showing the relative working positions of the sine-wave ring and the piston roller assembly.
Figure 23:
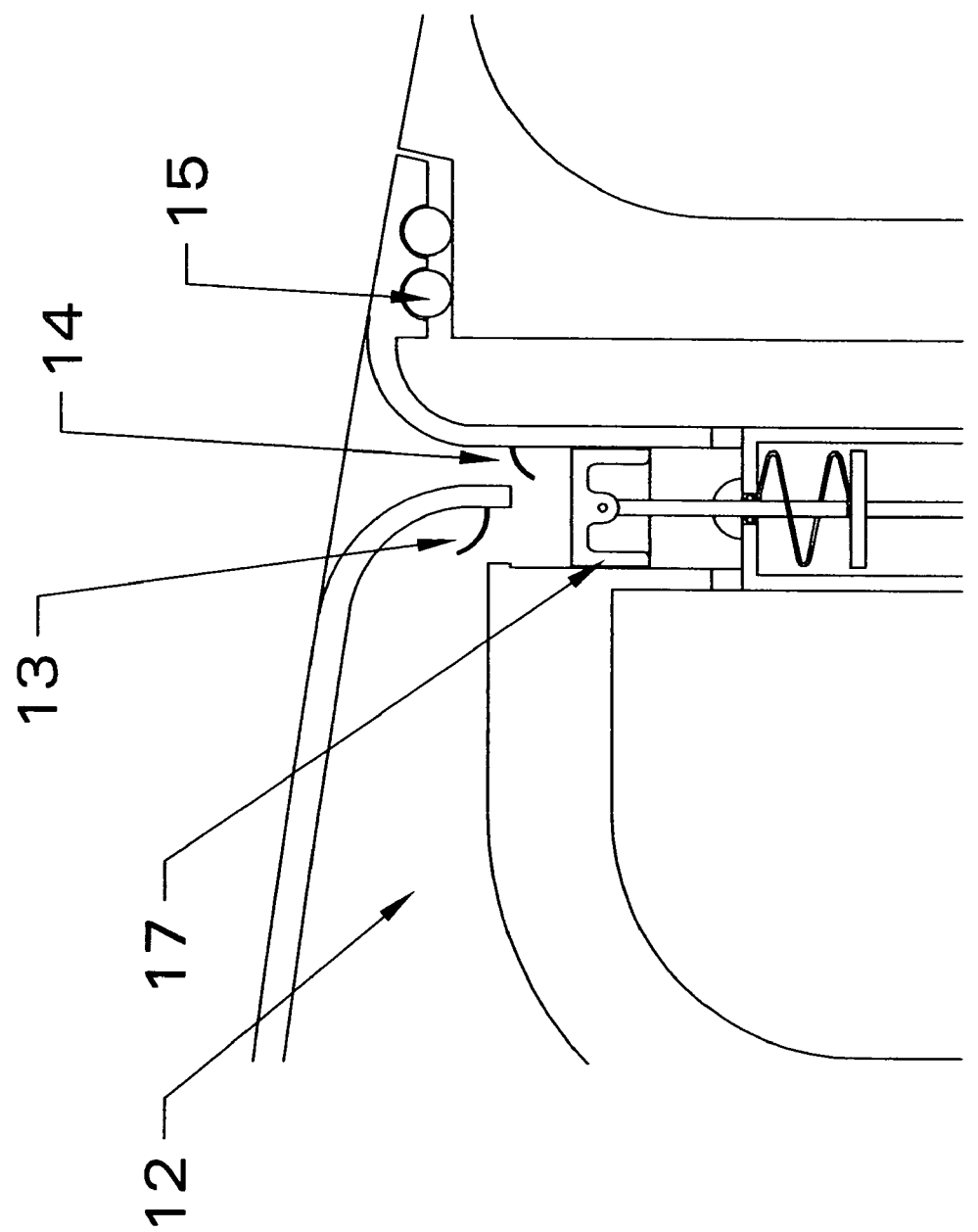
FIG. 23 is an enlarged view showing the flexible flap for piston intake of outside air and the flexible flap for piston exhaust of air into the compression chamber.
Figure 26:
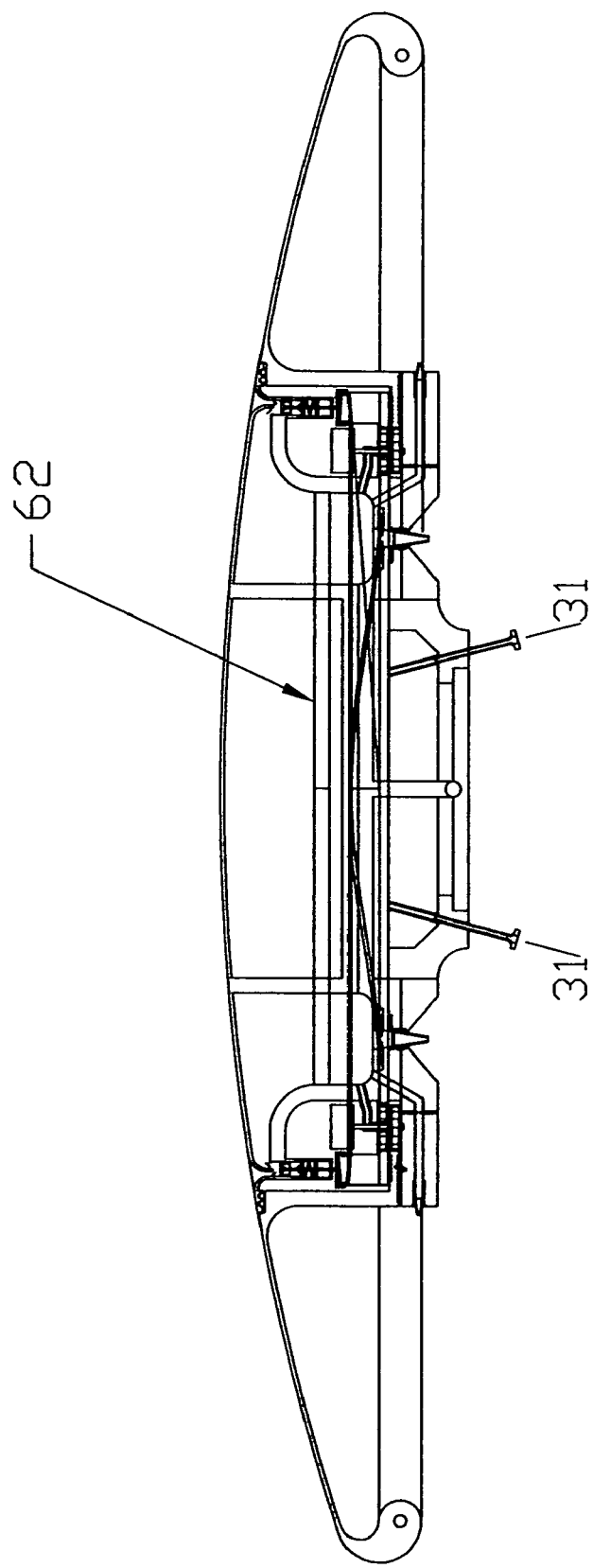
FIG. 26 is a cut-away view of the aircraft depicted in FIG. 2.

Imbedded in the inward hull (2) are a plurality of air intake ports (4) which are designed to rapidly draw air from the atmosphere into a compression chamber (12), see FIGS. 15 and 22, and this sucking of air creates a negative pressure on the upper surfaces of the inward and outward hulls creating a tendency toward an upward pull on the entire aircraft. Compressed air within the chamber (12) is allowed to be released through an evenly spaced plurality of downward facing lift thrusters (8) which create the tendency to push the aircraft upward thereby, in conjunction with the negative pressure, achieving flight.

As shown in FIG. 5, compressed air from within the chamber (12), will be exhausted through the directional and stabilization thrusters (9) and air will constantly flow through these when the outward hull is rotating and will blow in a direction opposite to that of the hull in order to prevent rotation of the inward hull. Additionally, the greatest quantity of compressed air will be forced through the propulsion thruster (6) and will propel the aircraft forward or backwards.

If at any time during takeoff, flight, or landing, additional lift for the aircraft is needed, it may be provided by adjusting the attitude of the air foil propellers (10) shown in FIG. 5 and FIG. 9, by rotating them along a radial axis line originating from the central axis (64) (see FIG. 8) of the aircraft and traveling along the surface of the outward hull.

Figure 19:
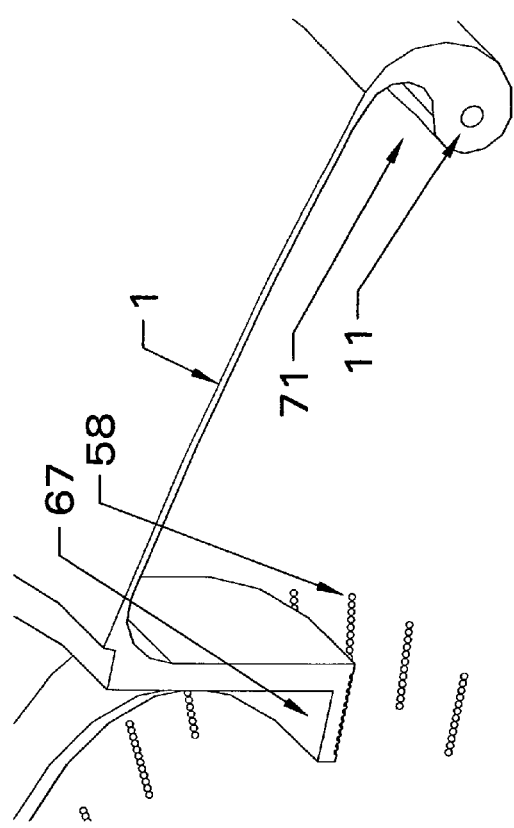
FIG. 19. is an enlarged section of the embedded annular gyroscopic stabilizer and the roller bearing ring.
Figure 21:
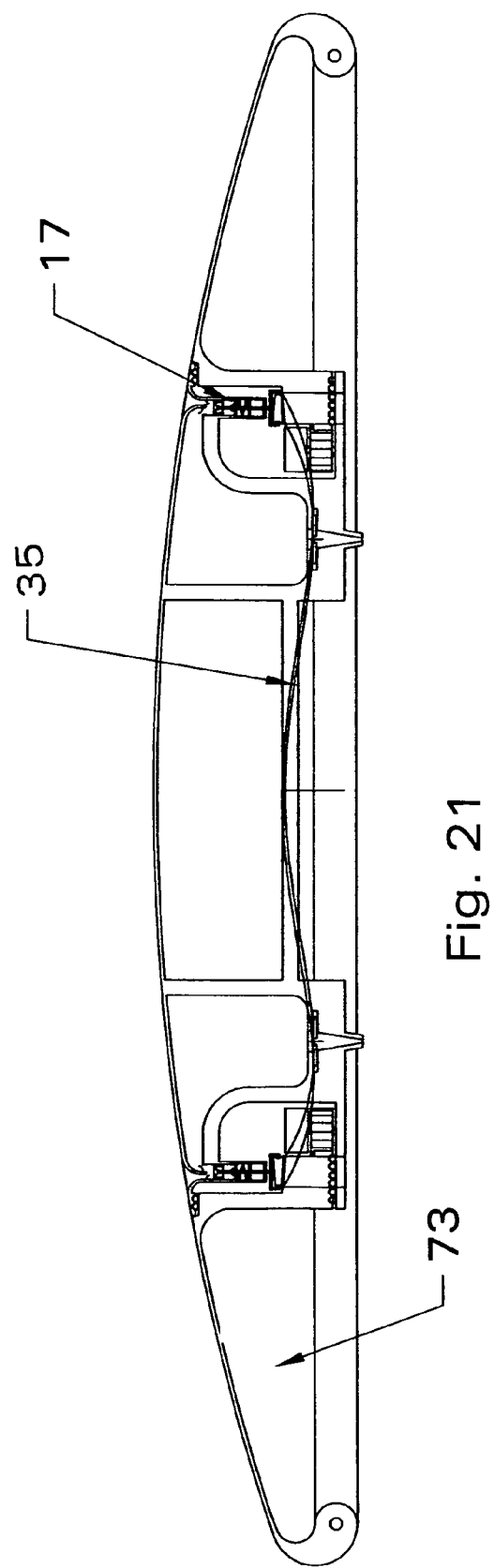
FIG. 21 is a full front section of embodiments of the present invention assembly showing the relative working positions of the sine-wave ring and the piston roller assembly.

Primarily, embodiments of the present invention are designed to be flown with the air foil propellers in a closed position (3) as shown in FIG. 10. Within the embodiments of this invention and consistent with the outer ring of the outer hull is an imbedded annular weight (11) (see FIGS. 9 and 19) which may be composed of stranded stainless steel wires, which serves to function as a gyroscope for the entire aircraft such that the entire apparatus is affected by its stabilizing effect. Being a continuous ring, it additionally has the effect of holding the structure intact and maintaining its structural integrity while it is in motion. The spinning motion provides a centrifugal force while the annular ring creates a counterbalancing centripetal force.

Figure 8:
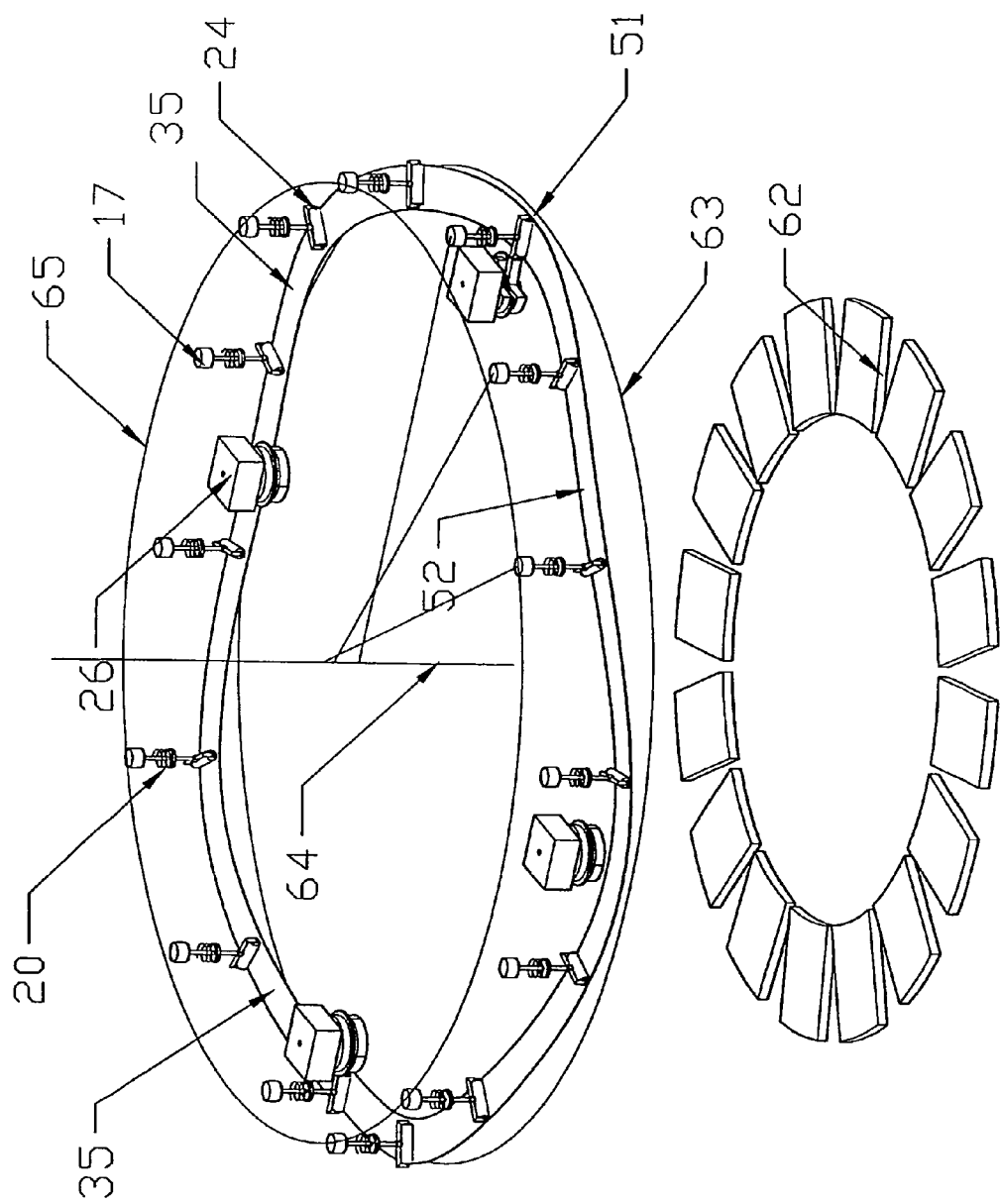
FIG. 8 is a perspective view of the sine-wave ring with piston assemblies and motor assemblies and a perspective view of the optional atmospheric filtering system.
Figure 14:
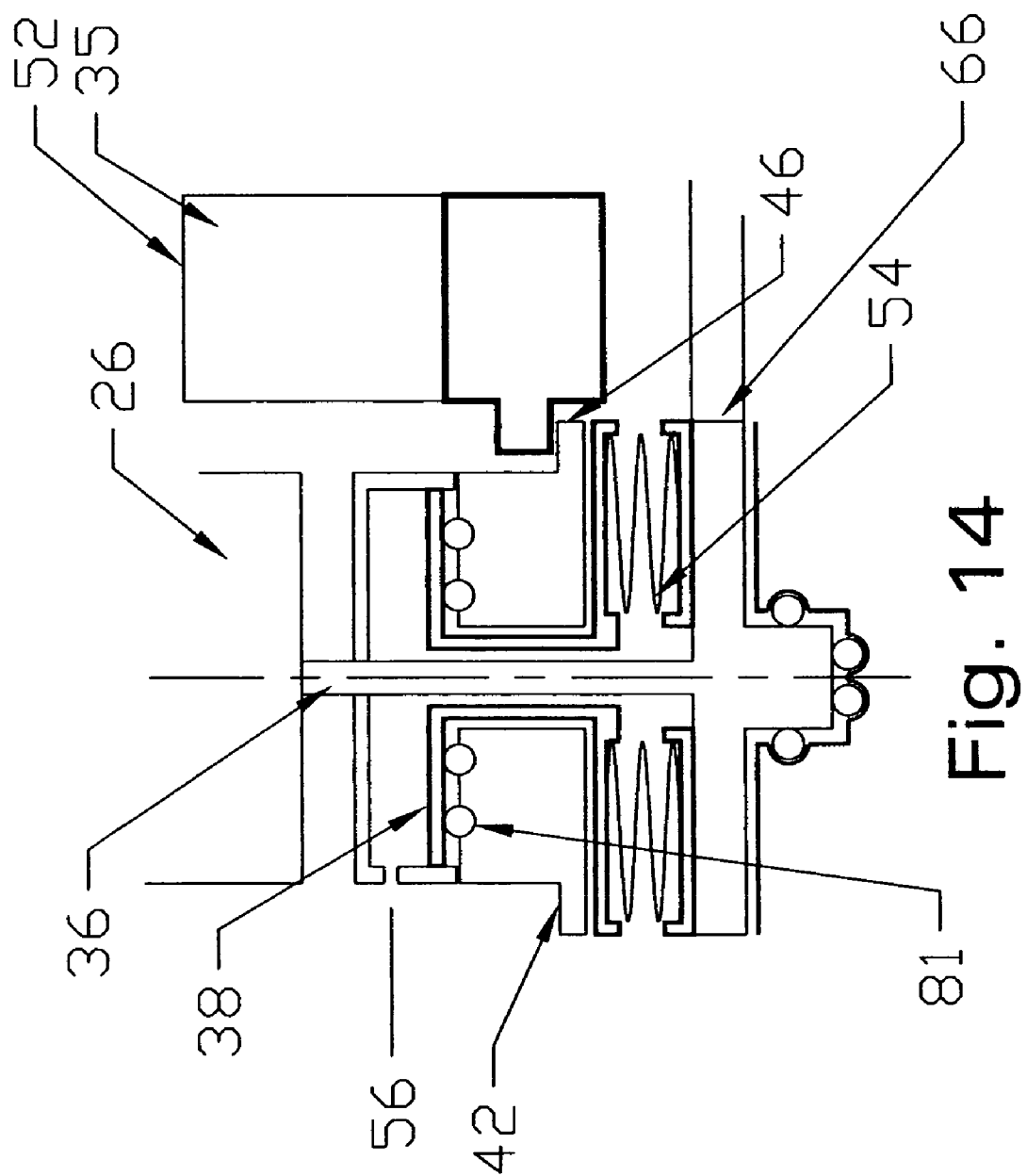
FIG. 14 is a section view of the sine-wave ring showing the lower drive wheel and the upper drive-wheel in contact with the sine-wave ring.

In the space between the vertical leg of the rotating outward hull (5), FIG. 15, and the vertical leg of the stationary inward hull (79), a plurality of substantially identically weighted, equally spaced motors (26), FIG. 8, are positioned to be balanced around the central axis (64). Each said motor rotationally drives a rod (36), FIG. 14, that attaches to a lower drive wheel (48), FIGS. 14 and 24. Each of these rods (36) turns the lower drive wheel and either a friction connection or a gear connection (66) between the lower drive wheel and the support arm (67) for the outward rotating hull creates the motion which causes the outward hull to rotate. The support arm (67) rests on an annular roller bearing ring (58) embedded in the lift thruster base plate (78). A ring of roller bearings (15) embedded in the outer lip of the stationary inward hull working in conjunction with said annular roller bearings (58) and the lower drive wheel (48) connection (66) permits the outward hull to rotate freely creating the gyroscopic action.

The lower drive wheel (48) attaches to an upper drive wheel (40) by a spring connection (54) creating a similar rotation upon said upper drive wheel as exists in the lower drive wheel. This spring likewise causes a contact flange (42) to press (46) with a clutch-like grip against a projection lip (39) on a sine wave ring (35) creating a similar rotational motion in said sine wave ring as is exhibited in the outward rotating hull (1) thus causing the sine wave ring to function as a whole-system drive mechanism.

Figure 16:
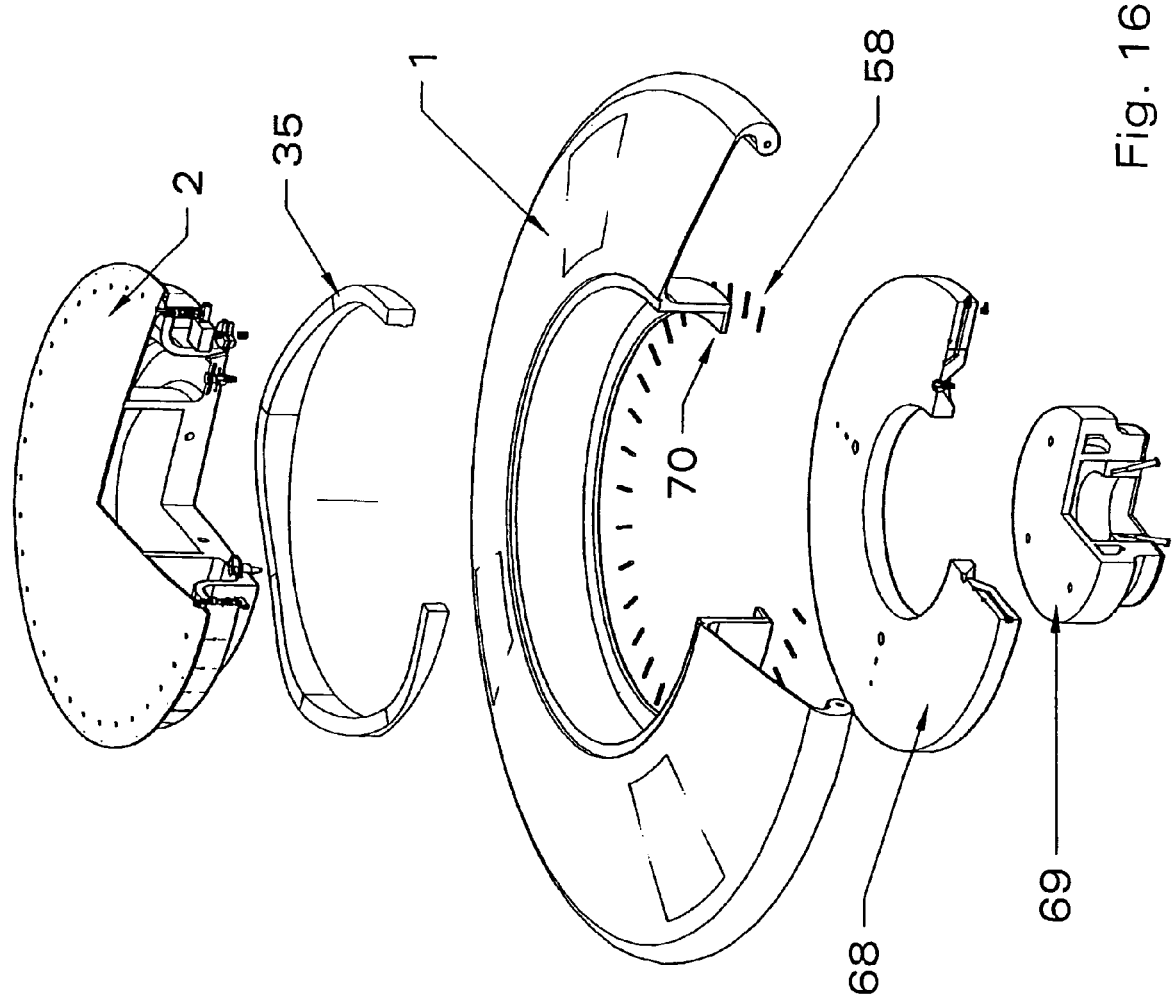
FIG. 16 is an exploded cut-away perspective view of the entire assembly
Figure 17:
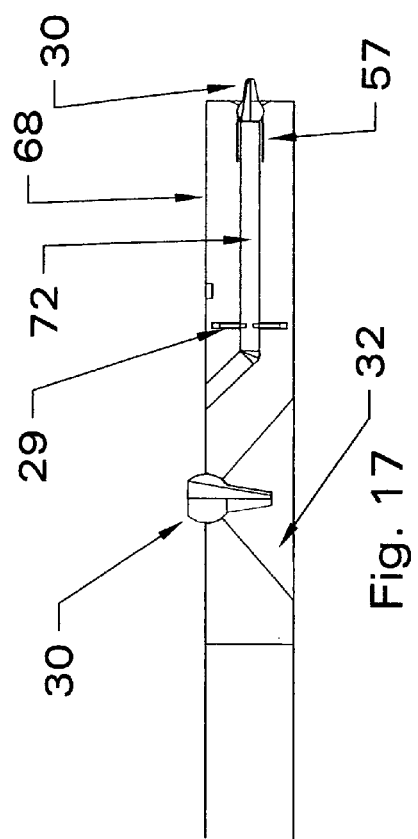
FIG. 17 is an enlarged section of a lift thruster and a directional guidance and rotational stabilization thruster.

The sinusoidal ring (35), FIGS. 8 and 16, consists of a situation whereby the harmonic motion of a sinusoid is positioned around the circumference of a circle and the distance of one cycle becomes a whole number multiple of that circumference. As known to one of ordinary skill, the equation for the sinusoid takes the basic form:

$$dy = r \sin A$$

where y is equal to the amplitude, but in order for the harmonic motion of the sinusoidal ring to permit the piston roller (24) to move freely over the rotating surface, the coefficient d of y must be less than about 0.5.

Figures 6, 7:
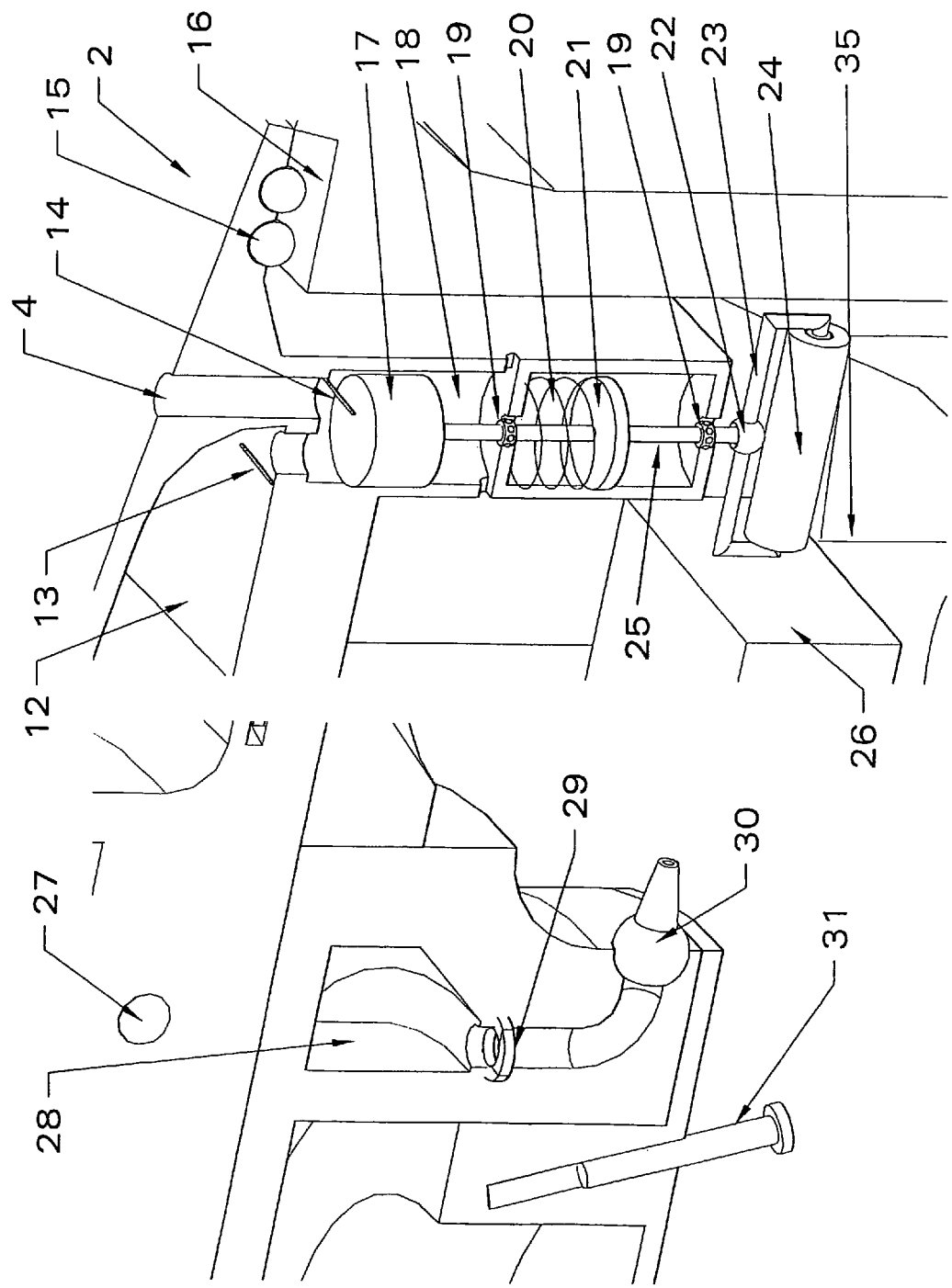
FIG. 6 is a cut-away pictorial showing the propulsion thruster.
FIG. 7 is a cut-away pictorial showing the piston-roller assembly.

If the peak amplitude matched the normal sine curve, the forward movement of the sinusoidal ring against the piston roller (24) would be impeded because the vertical incline would be too steep. The harmonic amplitude movement of the piston would be destroyed likely causing the piston rod (25), FIG. 7, to be snapped. Also, in order for the sinusoidal ring to be constructed with continuous cycles flowing smoothly, the radius of the circumference of the sinusoidal ring is beneficially divisible by the radius of the sinusoid and be equivalent to a whole number quotient. As seen in the stretch-out view of said sinusoidal ring (35) in FIG. 11, the peak amplitude (52) is not much higher than the low height (51) creating a smooth flowing curve. FIG. 12 illustrates one cycle of the sine wave. The domain for the ring is equal to the circumference of the ring, and in the illustration as shown in FIG. 11, the said domain is equal to four cycles of the sinusoid that travels around its circumference. The circular base (63) of the sinusoidal ring defines the circumference of the ring with the upper oscillation movements being defined by the peak amplitude of the piston assembly (65), FIG. 8.

As the sinusoidal ring (35) turns, the harmonic movement is transferred to the piston assembly (17), as the piston roller (24), always in physical contact with the said ring, rolls along the modulating surface of said ring as it passes through the peak amplitude (52) and base amplitude (51) phases. The piston assembly (17) is housed within the inner stationary hull 2 and is likewise non-rotational. The said piston roller maintains its contact with the sinusoidal ring (35) due to the action of a piston spring (20) pressing against a piston spring flange (21) that is a part of the piston rod (25). The oscillation of the piston rod is enhanced by being encased in sealed, Teflon-coated roller bearings (19). A rocker arm (23) attached to a ball and socket connection (22) permits the piston roller (24) to maintain contact with the entire upper surface of the sinusoidal ring as it rotates by matching the degree of tilt of said surface. The vertical oscillation of the piston assembly (17) in the piston chamber (18) creates, alternately, a pressure-vacuum condition in said chamber, and the vacuum phase creates a pull against the air intake flap (14) seated at the base of the air intake opening (4) causing it to open while at the same time, the same action causes the exhaust flap (13) leading to the compression chamber (12) to be sealed against the said compression chamber opening rim. Air is sucked into the piston chamber (18) on the downward, vacuum stroke of the piston, and conversely, the upward compression stroke of said piston causes a pressure buildup in the said piston chamber forcing the intake flap (14) to seal closed against its rim and also forcing the exhaust flap (13) to open forcing air into the interior compression chamber. The air being sucked into the air intake port (4) creates the said negative pressure that aids in lift situations.

Accumulated compressed air in the air compression chamber (12) is used to supply all three types of thrusters—propulsion thrusters (6), lift thrusters (8), and directional/stabilization thrusters (9). All of these thrusters may beneficially be of a modified air screw-impeller type, and control of the quantities of air flow to the thrusters will be maintained by aperture openings (29) leading to the thrusters.

The directions that the thrusters are pointing (77), FIG. 24, will determine the resulting direction of thrust and will be used primarily for rotational stabilization and directional control. The direction of the ball and socket rotational air screw impellers (30) will be controlled by pressure directional controls (57). Annular tube feeders (27) from the compression chamber (12) to an auxiliary high-compression chamber (28) for propulsion thrusters (28) provide maximum forward and stopping motion. A modified adaptation of this configuration would permit a ram-jet assembly to be substituted for the propulsion thrusters with the fuel stored in the battery or fuel storage compartment (60).

Operationally, the contact flange (42) on the upper drive wheel (40) is in contact (46) with the projection lip (39) on the sinusoidal ring (35). In a situation where excess pressure should be built up in the compression chamber (12), excess air pressure from the said chamber will pass through an intake opening (55), FIG. 13, into a pressure relief compression chamber applying said pressure to a moveable compressor (38) which moves within the pressure relief compression chamber housing (37) and acts in opposition to a spring located within a housing (45). When the pressure (56) is not sufficient to affect the spring, the resistance spring (54) is not compressed and causes the lower drive wheel to press against the projection lip (39) on the sine-wave ring (35) thereby allowing the rotational motion of said sine-wave ring to generate the compression necessary for flight. The roller bearings (81) allow the upper drive wheel (40) to spin freely within the chamber housing (37). When the pressure (55) builds up sufficiently to overcome the resistance to the compression spring (44), a gap (41) is created thereby not permitting said upper drive wheel (40) to drive the motion of the sinusoidal ring (35) alleviating pressure buildup. There are other methods by which excessive pressure buildup can be overcome, pop open valves and such, this is simply one. The rotating connecting rod (36) from the motor is held in place by a base spindle (47) that is allowed to rotate due to the action of side bearings (49) and spindle bearings (53) housed within the upper surface of the lower plate (50).

In order to easily achieve flight, the VTOL should be constructed of light weight materials, likely plastics. However, because of the dangers of space debris, the exterior hull should also be strong to avoid being punctured. Exemplary materials for the hull includes such things as several plies of titanium mesh (76) and Keviar 29 fabric (75) with exterior surfaces of clear fiberglass.

Other improvements and additions are contemplated as well for embodiments of the present invention although not explicitly described in detail herein. For example, retracting arms that are configured to grip objects or people can be added without departing from the scope of the present invention. Furthermore lifting devices may be attached to various portions of the aircraft exterior to aid in lifting objects with the aircraft. Thus, there has been described herein a remote controlled or manned saucer shaped vertical takeoff and landing (VTOL) aircraft which includes a ducted compression thrust in conjunction with an auxiliary propeller lift, powered by batteries or magnetic induction engines to propel in vertical, hover, and horizontal flight such VTOL aircraft and to steering assemblies and other controls for controlling translational movement and maneuvering of all such aircraft.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A vertical take-off and landing aircraft, comprising:
    an outer saucer-shaped hull configured to rotate around a central axis of the aircraft thereby creating a gyroscopic effect for the aircraft;
    a plurality of air foil propellers positioned on a top surface of the outer saucer-shaped hull and configured to be in a closed position or an open position;
    an inner stationary hull having a central axis substantially aligned with a central axis of the outer saucer-shaped hull and configured to be positioned within an annular opening of the outer saucer-shaped hull;
    a plurality of motors located between the outer saucer-shaped hull and the inner stationary hull and configured to rotate the outer saucer-shaped hull relative to the inner stationary hull; and
    a plurality of pistons positioned within the inner stationary hull and configured to travel substantially perpendicular to a top surface of the inner stationary hull so as to draw air into the aircraft; and
    a sinusoidal ring configured so that a height of a top surface of the ring varies in a sine-wave fashion around its perimeter, wherein the sinusoidal ring is in mechanical communication with the outer saucer-shaped hull such that rotation of the outer saucer-shaped hull results in rotation of the sinusoidal ring, and wherein the plurality of pistons are in mechanical communication with the top surface of the sinusoidal ring such that motion of each piston varies as the sinusoidal ring rotates.

2. The aircraft of claim 1, wherein in the closed position the air foil propellers resist descent of the aircraft and in the open position, the open position being adjustable such that an amount of openness controls an amount of lift acting on the aircraft.

3. The aircraft of claim 1, wherein the inner stationary hull includes a plurality of air intake openings corresponding, respectively to the plurality of pistons.

4. The aircraft of claim 3, further comprising:
    a compression chamber configured to receive air from the plurality of air intake openings and exhaust the air through one or more thrusters.

5. The aircraft of claim 4, wherein the one or more thrusters include:
    one or more stabilization thrusters configured to exhaust air in a direction opposite that of a direction the aircraft is rotating.

6. The aircraft of claim 4, wherein the one or more thrusters include:
    one or more lift thrusters configured to exhaust air to thereby control an inclination of the aircraft.

7. The aircraft of claim 4, wherein the one or more thrusters include:
    one or more propulsion thrusters configured to exhaust air to thereby control a direction of the aircraft.

8. The aircraft of claim 4 wherein at least one of the one or more thrusters is configurable to be in one of a plurality of different positions so as to control a direction in which the air is exhausted.

9. The aircraft of claim 1, further comprising:
    a cleaner assembly configured to remove pollutants from an environment in which the aircraft is traveling.

10. The aircraft of claim 9, wherein the cleaner assembly is further configured to intake an ambient atmosphere in which the aircraft is traveling, remove pollutants therefrom to generate a clean exhaust gas which is exhausted into the environment.

11. The aircraft of claim 1, further comprising:
    a plurality of support legs configured to extend from and retract into an underside portion of the aircraft.

12. The aircraft of claim 1, wherein the outer saucer-shaped hull includes an annular weight around its periphery configured to enhance the gyroscopic effect and provide structural integrity to the outer saucer-shaped hull.

13. The aircraft of claim 1, wherein each of the plurality of motors is configured to rotate a respective drive wheel so as to impart rotational forces on the outer saucer-shaped hull.

14. The aircraft of claim 1, wherein the sinusoidal ring has a radius substantially similar to an outside radius of the inner stationary hull.

15. The aircraft of claim 14, wherein a circumference of the sinusoidal ring is an integer multiple of a wavelength at which the height of the sinusoidal ring varies.

16. The aircraft of claim 1, further comprising:
a plurality of batteries configured to power the plurality of motors.

17. The aircraft of claim 1, further comprising:
a plurality of bearings positioned between the inner stationary hull and the outer saucer-shaped hull.

18. The aircraft of claim 4, further comprising a safety release mechanism configured to release air from the compression chamber to prevent a pressure of stored air from exceeding a predetermined threshold.

19. The aircraft of claim 1, wherein the aircraft is configured for terrestrial travel.

20. The aircraft of claim 1, wherein the aircraft is configured for extraterrestrial travel.

* * * * *